United States Patent
Atkinson

(10) Patent No.: US 7,334,143 B2
(45) Date of Patent: Feb. 19, 2008

(54) COMPUTER POWER CONSERVATION APPARATUS AND METHOD THAT ENABLES LESS SPECULATIVE EXECUTION DURING LIGHT PROCESSOR LOAD BASED ON A BRANCH CONFIDENCE THRESHOLD VALUE

(75) Inventor: Lee W Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 10/828,390

(22) Filed: Apr. 19, 2004

(65) Prior Publication Data

US 2005/0235170 A1    Oct. 20, 2005

(51) Int. Cl.
    *G06F 1/32*    (2006.01)
(52) U.S. Cl. ....................... 713/320; 712/239
(58) Field of Classification Search .............. 712/235, 712/239; 713/320
    See application file for complete search history.

(56) References Cited

U.S. PATENT DOCUMENTS

| | | | |
|---|---|---|---|
| 5,072,376 A | 12/1991 | Ellsworth | |
| 5,625,826 A | 4/1997 | Atkinson | |
| 5,719,800 A * | 2/1998 | Mittal et al. ............... | 713/321 |
| 5,996,083 A | 11/1999 | Gupta et al. | |
| 6,282,663 B1 | 8/2001 | Khazam | |
| 6,442,652 B1 * | 8/2002 | Laboy et al. ............... | 711/138 |
| 6,820,173 B1 * | 11/2004 | Bittel et al. ................. | 711/137 |
| 6,845,456 B1 * | 1/2005 | Menezes et al. ............ | 713/320 |
| 6,961,847 B2 * | 11/2005 | Davies et al. .............. | 712/235 |
| 7,028,196 B2 * | 4/2006 | Soltis et al. ................ | 713/300 |
| 2002/0053038 A1 * | 5/2002 | Buyuktosunoglu et al. . | 713/320 |
| 2004/0003215 A1 * | 1/2004 | Krimer et al. .............. | 712/235 |

OTHER PUBLICATIONS

Erik Jacobsen,et.al, "Assigning Confidence to Conditional Branch Predictions", IEEE, 1996 pp. 142-152.
James E. Smith, "A Study Of Branch Prediction Strategies", IEEE, 1981, pp. 135-148.
Dah-Lih Jeng,et.al, "Context-Based Branch Prediction For High-Performance And Lower-Power Computing" National Defense University, Chung Cheng Institute of Technology, 8 pgs.
Eui-Young Chung,et.al,"Dynamic Power Management Using Adaptive Learning Tree", IEEE 1999, pp. 274-279.
Jayanth Srinivasan,et.al, "Predicitve Dynamic Thermal Management For Multimedia Applications", ICS'03,Jun. 23-26, 2003, San Francisco, California, Copyright 2003.pp. 109-120.
Daniel Chaver,et.al, "Branch Prediction On Demand: an Energy-Efficient Solution", ISLPED'03, Aug. 25-27, 2003, Seoul, Korea, Copyright 2003, pp. 390-395.

* cited by examiner

*Primary Examiner*—Chun Cao
*Assistant Examiner*—Albert Wang

(57) ABSTRACT

A computer measures a processor load and configures itself so that a lesser amount of speculative execution is enabled when the processor is lightly loaded than is enabled when the processor is heavily loaded.

23 Claims, 2 Drawing Sheets

COMPUTER POWER CONSERVATION APPARATUS AND METHOD THAT ENABLES LESS SPECULATIVE EXECUTION DURING LIGHT PROCESSOR LOAD BASED ON A BRANCH CONFIDENCE THRESHOLD VALUE

FIELD OF THE INVENTION

The present invention relates generally to power conservation for computers.

BACKGROUND OF THE INVENTION

Modern computer systems have incorporated many advanced techniques in order to improve the speed of program execution. In a pipelined processor, portions of the execution of a single machine instruction are separated and performed in separate pipeline stages. For example, the instruction fetch, instruction decode, data fetch, computation, and result storage portions of an instruction could be performed in five separate pipeline stages, in assembly-line fashion. In the idealized case, each pipeline stage can perform its portion in one cycle of the system clock, and a new instruction can be initiated at each clock cycle, so while each instruction may take, for example, five clock cycles to execute, an instruction is completed every clock cycle. This technique can result in a significant performance improvement over a computer that must finish execution one instruction before starting execution of the next, and a modern pipelined computer system may approach the ideal of executing one instruction per clock cycle.

Pipelining is a simple form of parallelism, as several instructions can be in the process of execution concurrently, albeit at different stages. The efficiency of a pipelined processor is hindered if one instruction depends on the result of an immediately previous instruction. For example, if the result of one instruction is an operand for the next instruction, execution of the next instruction may need to be delayed or suspended until the previous result becomes available. This condition is called a pipeline stall. Some pipeline stalls can be avoided by careful programming that separates instructions whose operands may be dependent. Modern compilers often reorder instructions, when possible, for this purpose.

Conditional branch instructions are a particularly troublesome cause of pipeline stalls. Because the program control flow depends on the outcome of the condition test in a conditional branch instruction, the location of the next instruction is not known until the branch instruction is complete or nearly so. Program execution must wait until the condition test result is known and the next instruction can be located.

One way processors try to mitigate the inefficiencies of pipeline stalls resulting from conditional branch instructions is to perform speculative execution. For example, the processor may temporarily disregard the fact that the branch instruction may direct the program flow elsewhere, simply fetch the next instruction following the branch, and begin executing that next instruction while the condition is being evaluated. If the branch is taken, sending the program flow elsewhere, then any work done in executing the fetched next instruction is discarded and the correct instruction, from the program location at the destination of the branch, is fetched and issued. This is called the "predict not taken" strategy. If the branch is not taken and the fetched instruction is the correct one, the processor has avoided a pipeline stall. If the branch is taken and the speculative work on the fetched instruction must be discarded, little or no time is lost because without the speculative execution, the pipeline would have been stalled anyway. Other branch prediction strategies are possible as well. For example, a processor could use a "predict taken" strategy and predict all branches as taken rather than not taken, as in the example above.

Clearly, the more accurately the processor is able to predict the outcome of a conditional branch, the more often it will be able to fetch the correct instruction, and the more often its speculative work on that next instruction will pay off and not have to be discarded. Accordingly, several strategies exist for improving the accuracy of branch prediction. In some processors, the branch instruction itself contains a flag that indicates whether to predict the branch as taken or not taken. The flag is set by the compiler, which chooses the instruction form based on a software algorithm. For example, the compiler may assume that a conditional branch at the end of a short "do loop" will usually be taken, and select the instruction form accordingly. Because the compiler is software, it can use an algorithm of considerable complexity for branch prediction. The compiler may even generate a confidence estimate for its predictions. For example, a branch that the compiler estimates will be almost always taken might be predicted as "taken", while a branch that the compiler estimates will be only usually taken might be classified as "weakly taken". Other branches might be classified as "not taken", "weakly not taken", or by other designations.

The processor may perform branch prediction in hardware. For example, the processor may maintain a table indicating whether each branch was taken or not taken the most recent time it was encountered, if ever, and predict the next occurrence of the branch to behave the same way. Past behavior of branches in programs is often a good predictor of their future behavior. More sophisticated schemes exist as well. For example, the processor may predict each branch to go to the same destination as it went previously, but only if it went the previous direction two consecutive times. Hardware prediction schemes such as these require that the processor maintain a table including the location of each branch, its prior behavior, and a predicted branch destination. This table may be quite large, adding complexity to the processor and consuming significant power.

Hardware branch prediction may also assign confidence to branch predictions. For example, the processor may maintain a counter for each branch, incrementing the counter each time the branch is taken and decrementing the counter each time the branch is not taken. The counter value may then be used as a branch predictor. The higher the counter value, the more often the branch has been taken, and therefore the more confidently the branch can be predicted to be taken, and conversely, the lower the value of the counter the more confidently the branch can be predicted as not taken. Depending on the size of the counter, many levels of confidence may be possible for each branch. Of course, this additional record keeping circuitry may contribute to a further increase in power consumption of the processor.

There is an incentive to construct ever more accurate, and presumably ever more complex branch prediction schemes. There is also an incentive to perform as much speculative execution as possible, so that more pipeline stalls can be avoided and computer performance is improved. However, any execution of instructions by the processor consumes power. Speculative execution that turns out to be wasted may not waste significant computing time, but wastes the energy expended in the computation, because the results are discarded.

While the performance enhancement offered by speculative execution is desirable in nearly any computer, the additional power consumption it entails is often a drawback, particularly in a portable computer. A portable computer is typically one designed to operate on a limited source of power, such as one or more batteries. It is highly desirable for a portable computer to operate as long as possible under battery power before the batteries are replaced or recharged.

SUMMARY OF THE INVENTION

A computer measures a processor load and configures itself so that a lesser amount of speculative execution is enabled when the processor is lightly loaded than is enabled when the processor is heavily loaded.

DETAILED DESCRIPTION

Figure 1:
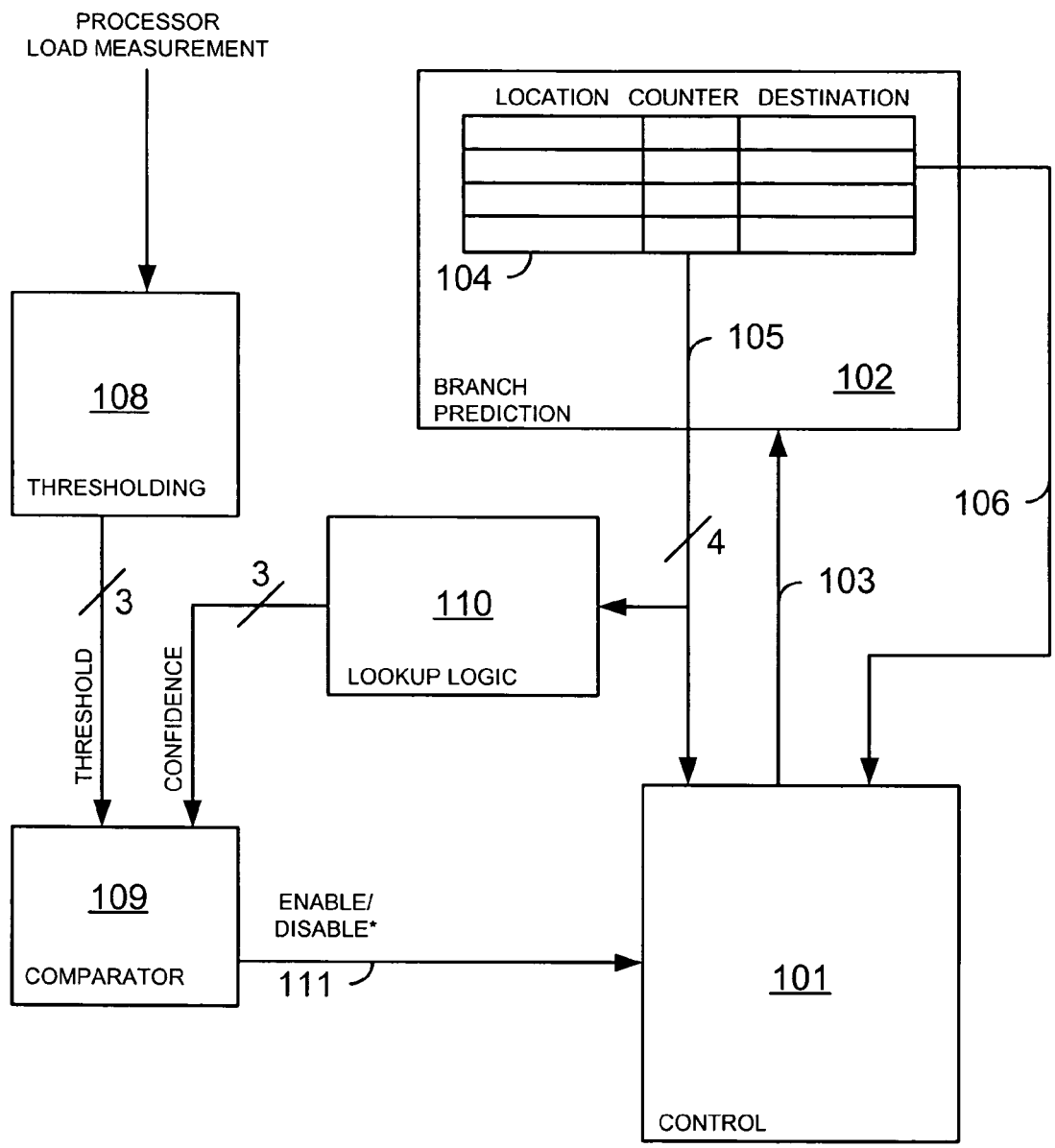
FIG. 1 schematically depicts computer logic in accordance with an example embodiment of the invention.

FIG. 1 schematically depicts computer logic in accordance with an example embodiment of the invention. The computer circuitry of FIG. 1 comprises a processor control portion 101 that controls the execution of a processor. For example, control portion 101 may fetch and decode instructions, and issue the instructions to an arithmetic/logic unit (ALU) (not shown) for execution. In the example circuitry of FIG. 1, control portion 101 also reports the behavior of conditional branch instructions to branch prediction unit 102. For example, when a conditional branch instruction is encountered in the execution of a program, control unit 101 records its location in the computer's memory, preferably by recording the value of the computer's program counter, and also records whether or not the branch was taken as a result of the condition test. If the branch was taken, control portion 101 may also report may also report the destination. The reporting of information from control portion 101 to branch prediction unit 102 is indicated in FIG. 1 by information link 103.

Branch prediction unit 102 maintains a branch table 104. Branch table 104 comprises, for each of several conditional branch instructions encountered during program execution, a branch location, a branch destination, and a branch history counter. The branch location is the location in memory of the branch instruction itself. The branch destination is the memory location of the next instruction to be executed if the conditional branch is taken. (If the branch is not taken, program control simply "falls through" to the next instruction in memory after the branch instruction itself, so the destination of a branch not taken is readily determined.)

Branch prediction unit 102 maintains the branch history counter for each conditional branch in the table by incrementing the counter each time the branch is taken, and decrementing the counter each time the branch is encountered but not taken. The counter may "saturate" so that its value never goes below zero and never exceeds the maximum value representable by a counter of the size of the branch counters in branch table 104. For example, a four-bit saturating counter will not alter its count if it is instructed to decrement when the counter value is zero, and will not alter its contents if it is instructed to increment when the counter value is 15 (decimal), but increments or decrements its value appropriately when the counter value is between 1 and 14 (decimal) inclusive.

The past behavior of a conditional branch is often a good predictor of its future behavior, so after a program has been executing for a period of time, the branch table contains information that can predict the behavior of conditional branch instructions. A branch that is usually taken will have a counter value that is higher than the counter value for a branch that is usually not taken. The example computer uses the counter value for a particular conditional branch instruction as a predictor for whether the branch will be taken, and as a confidence indicator for the prediction. The higher the counter value, the higher the confidence that the branch will be taken. For example, the possible counter values could be classified as follows:

| Counter value | Prediction | Confidence | Classification |
| --- | --- | --- | --- |
| 0-1 | Not taken | Very high | Strongly not taken |
| 2-4 | Not taken | High | Not taken |
| 5-7 | Not taken | Low | Weakly not taken |
| 8-10 | Taken | Low | Weakly taken |
| 11-13 | Taken | High | Taken |
| 14-15 | Taken | Very High | Strongly taken |

Some of the information in branch table 104 is passed back to control unit 101. For example, the counter value of the currently considered conditional branch instruction is passed through information link 105 as a predictor of the branch behavior. Also, the branch destination is passed through information link 106 so that, if the branch is predicted taken and speculative execution is to be performed, the control unit can cause the processor to begin executing instructions at the branch destination before the branch condition test is completed.

The computer system that comprises the example logic of FIG. 1 is also capable of monitoring the computational load on its processor. This processor load is a measure of how much computation is being required of the computer at a particular time. For example, when a computer is running a complex and computation-intensive program, its processor load will generally be high. A computer with a high processor load is sometimes referred to as heavily loaded. When the same computer has completed all of the processing jobs submitted to it and is waiting for user input, its processor load will generally be low. A computer with a low processor load is sometimes referred to as lightly loaded. Processor load is passed to the logic of FIG. 1 through information link 107.

Methods of measuring processor load are known, and several are described in U.S. Pat. No. 5,625,826 to Atkinson. In one method described by Atkinson, the computer measures its processor load by measuring a cache hit rate. When the computer is executing a large and complex program, and consequently has a high processor load, it will typically require instructions and data from a variety of memory locations. Under these conditions, the computer's cache hit rate is likely to be relatively low. When the computer is waiting for user input, it is typically executing a very short loop, repeating the same instructions frequently. In such a state, the computer's cache can almost always supply the needed instructions and data, so the computer's cache hit rate is high while its processor load is low. Thus, cache hit rate is a useful and measurable proxy for processor load, with the qualification that the relationship between cache hit rate and processor load is inverse. That is, a high cache hit rate corresponds to a low system load.

Atkinson describes other additional methods of measuring processor load. For example, processor load is also likely to correlate to the occurrence of memory page misses and input/output write cycles. Other methods are possible as well, in addition to those described by Atkinson. For example, the idle activity of the processor may be measured and correlated with processor load, or processor load may be assumed to correlate with intervals when the processor is configured to a lower operating frequency. Any or all of these or other methods for measuring processor load may be used individually or in any combination.

When a processor is lightly loaded, its maximum performance is typically not required to accomplish the tasks requested of it. For example, when a typical modern office computer waiting for user input, only a fraction of its capability is usually required in order for it to recognize when an input is received. In such a state, speculative execution, which is a power-consuming feature designed to improve the system's performance, provides little or no perceptible improvement in the computer's performance, but consumes power with little or no benefit to the user of the computer. This is especially troublesome in a battery-powered portable computer, because the extra power drain can shorten the amount of time the computer can operate between battery replacements or rechargings.

The example logic of FIG. 1 provides a way for a computer to configure itself so that a lesser amount of speculative execution is enabled when the processor is lightly loaded than is enabled when the processor is heavily loaded. Such a computer can therefore conserve power when expending the power would provide little or no benefit, and can provide maximum performance when that performance will provide a benefit to the user of the computer, making the additional power consumption worthwhile.

The example circuitry of FIG. 1 also comprises thresholding logic 108. Thresholding logic 108 computes a branch confidence threshold based on the processor load. For example, processor load may be expressed as a percentage of the available processor computing capability that is being devoted to tasks other than waiting for user input. In the example system of FIG. 1, and the branch confidence threshold may be expressed as a binary value having one fewer bit than the branch history counters in branch prediction unit 102. For example, thresholding logic 108 may assign 3-bit values to the branch confidence threshold according to the following table (decimal values are used for the threshold values in the table):

| Processor load | Branch confidence threshold |
| --- | --- |
| 0-12 | 7 |
| 13-25 | 6 |
| 26-37 | 5 |
| 38-50 | 4 |
| 51-62 | 3 |
| 63-75 | 2 |
| 76-87 | 1 |
| 88-100 | 0 |

The function of thresholding logic 108 may be performed in hardware or software, or a combination of the two. Other relationships between the processor load and branch confidence threshold are possible. In the example circuitry of FIG. 1, the branch confidence threshold is supplied to one set of inputs of comparator 109.

A second set of inputs of comparator 109 is supplied with a confidence level computed from the branch history counter corresponding to the branch instruction currently under consideration. The branch history counter value combines both a prediction and a confidence indication. The confidence level, independent of the predicted direction of the branch, is extracted by lookup logic 110. For example, lookup logic 110 may extract 3-bit confidence level values as follows:

| Branch history counter value | Confidence level |
| --- | --- |
| 0 or 15 | 7 |
| 1 or 14 | 6 |
| 2 or 13 | 5 |
| 3 or 12 | 4 |
| 4 or 11 | 3 |
| 5 or 10 | 2 |
| 6 or 9 | 1 |
| 7 or 8 | 0 |

Comparator 109 compares the branch confidence threshold supplied by thresholding logic 108 with the confidence level, for the branch instruction currently under consideration, supplied by lookup logic 110 and produces ENABLE/DISABLE* signal 111 indicating whether speculative execution is to be enabled for this branch instruction. Control unit 101 enables or disables speculative execution in response to the ENABLE/DISABLE* signal.

In the example embodiment shown, comparator 109 indicates that speculative execution is to be enabled whenever the confidence level computed from the branch history counter value by lookup logic 110 is greater than or equal to the branch confidence threshold supplied by thresholding logic 108. Thus by adjusting the branch confidence threshold in response to the processor load, thresholding logic 108 can adjust the amount of speculative execution that is performed by the processor. When the branch confidence threshold is raised, a particular branch must have a higher confidence level in order for speculative execution arising from that branch to be performed. Because the branch confidence threshold is raised when the processor is less heavily loaded, the system provides that less potentially power-wasting speculative execution is performed when the resulting reduction in performance is most tolerable, and likely not even noticeable. When the processor is heavily loaded, speculative execution is enabled at a lower confidence level, as processor performance is then of heightened importance in relation to the power consumption resulting from speculative execution.

In addition to the energy consumed by speculative execution, branch prediction unit 102 also consumes power. At some times, it may be desirable to suspend the operation of branch prediction unit 102 in addition to suppressing speculative execution in order to conserve additional power. For example, if the processor has been idle for an extended period, it may be reasonable to assume that it will continue to be idle, and that branch prediction is not providing any immediate benefit.

Figure 2:
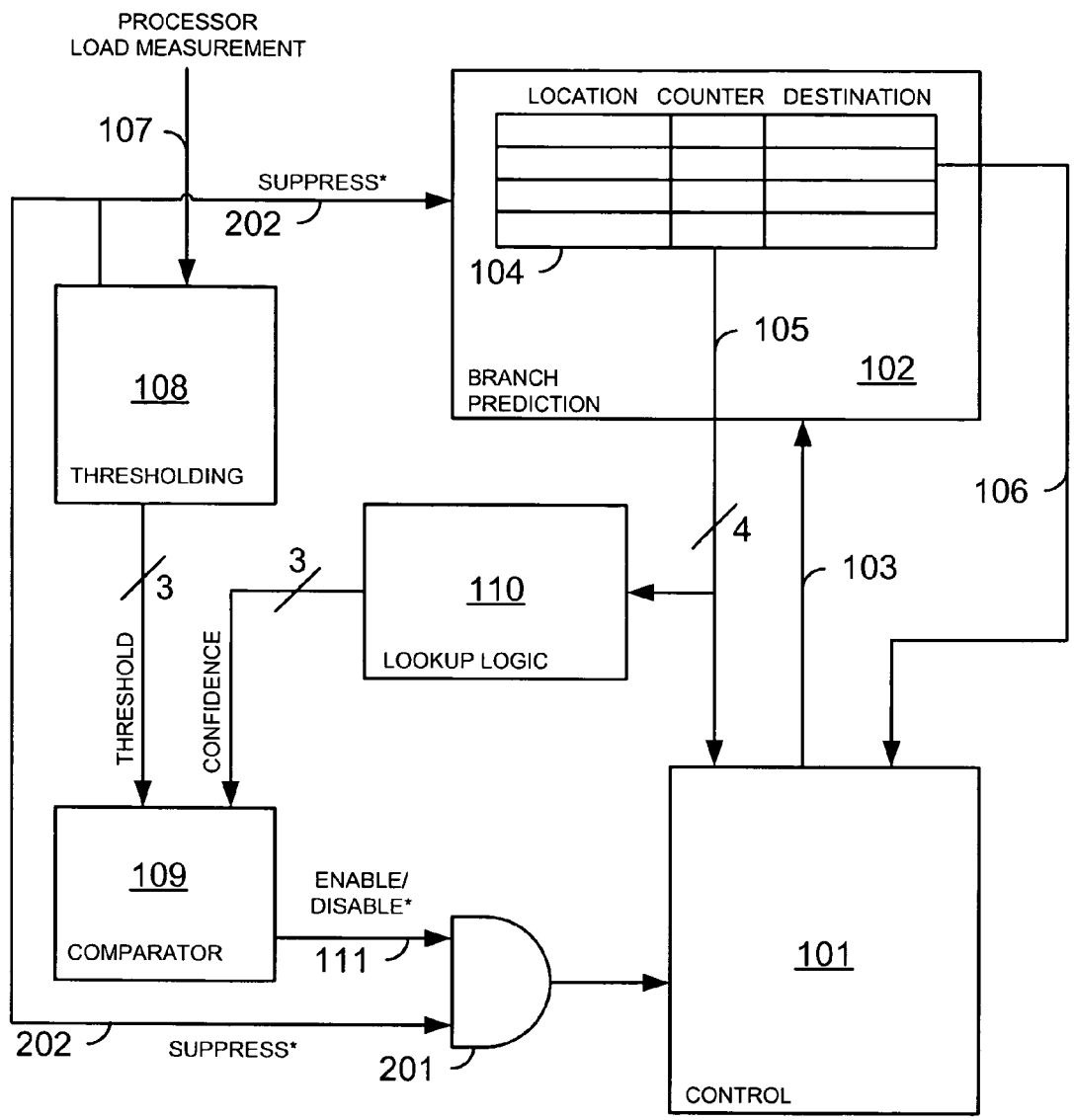
FIG. 2 schematically depicts computer logic in accordance with a second example embodiment of the invention.

FIG. 2 schematically depicts computer logic in accordance with a second example embodiment of the invention. In the example circuitry of FIG. 2, thresholding logic 108 generates a SUPPRESS* signal 202 that is passed to branch prediction, and is also connected to one input of AND gate 201. The ENABLE/DISABLE* signal is connected to the other input of AND gate 201, so that speculative execution can be disabled using either the ENABLE/DISABLE* signal or SUPPRESS* signal 202. Branch prediction unit 102 can suspend its operation in response to SUPPRESS* signal 202.

Methods of disabling the operation of a functional unit of a processor, such as branch prediction unit 102, are known.

U.S. Pat. No. 5,996,083 to Gupta, et al. describes a technique for disabling a functional unit of a computer. In one embodiment of Gupta et al., a transistor is interposed between the functional unit and a supply voltage terminal, enabling the computer to disconnect the functional unit from its power source, effectively disabling the functional unit.

The invention claimed is:

1. A method of conserving power in a computer, comprising:
   measuring a processor load;
   configuring the computer, based on the processor load, so that a lesser amount of speculative execution is enabled when a processor is lightly loaded than is enabled when the processor is heavily loaded;
   assigning a first value to a branch confidence threshold when the processor is heavily loaded; and
   assigning a second value to the branch confidence threshold when the processor is lightly loaded, wherein the first value is less than the second value.

2. The method of claim 1, wherein configuring the computer comprises configuring a battery-powered computer.

3. The method of claim 1, wherein measuring the processor load further comprises measuring a cache hit rate.

4. The method of claim 3, further comprising assigning a first value to the processor load in response to a first measurement of the cache hit rate, and assigning a second value to the processor load, higher than the first value assigned to the processor load, in response to a second measurement of the cache hit rate, lower than the first measurement of the cache hit rate.

5. The method of claim 1, wherein measuring the processor load further comprises measuring the occurrence of memory page misses.

6. The method of claim 1, wherein measuring the processor load further comprises measuring the occurrence of input/output write cycles.

7. The method of claim 1, further comprising:
   assigning to a branch instruction a confidence level that the branch instruction will be predicted correctly;
   comparing the confidence level with the branch confidence threshold; and
   deciding based on the result of the comparison whether to enable speculative execution.

8. The method of claim 7, wherein the confidence level that the branch instruction will be predicted correctly is assigned by a compiler at the time a program containing the branch instruction is compiled.

9. The method of claim 7, wherein the confidence level that the branch instruction will be predicted correctly is assigned by hardware.

10. The method of claim 7, wherein the confidence level that the branch instruction will be predicted correctly is based on past behavior of the branch instruction.

11. The method of claim 1, further comprising disabling branch prediction when the processor is lightly loaded.

12. A computer, comprising:
    means for measuring a processor load;
    means for deciding, based on the processor load, whether to enable speculative execution;
    means for assigning a first value to a branch confidence threshold when the processor is heavily loaded; and
    means for assigning a second value to the branch confidence threshold when the processor is lightly loaded, wherein the first value is less than the second value.

13. The computer of claim 12, further comprising means for adjusting the criteria upon which a decision is made whether to enable speculative execution so that a greater amount of speculative execution is enabled when the processor is heavily loaded than is enabled when the processor is less heavily loaded.

14. The computer of claim 12, further comprising means for assigning to a branch instruction a confidence level that the branch instruction will result in a taken branch.

15. The computer of claim 12, wherein the computer considers a branch prediction confidence level when deciding whether to enable speculative execution.

16. A computer that configures itself, based on a processor load, so that a lesser amount of speculative execution is enabled when a processor is lightly loaded than is enabled when the processor is heavily loaded, wherein the computer is further configured to assign a first value to a branch confidence threshold when the processor is heavily loaded and a second value to the branch confidence threshold when the processor is lightly loaded, and wherein the first value is less than the second value.

17. The computer of claim 16, wherein the computer is battery-powered.

18. The computer of claim 16, wherein the processor load is measured by measuring a cache hit rate.

19. The computer of claim 18, wherein a relatively higher cache hit rate indicates a relatively lower processor load, and a relatively lower cache hit rate indicates a relatively higher processor load.

20. The computer of claim 16, wherein the processor load is measured by measuring the occurrence of memory page misses.

21. The computer of claim 16, wherein the processor load is measured by measuring the occurrence of input/output write cycles.

22. A computer, comprising:
    logic that assigns to a branch instruction a confidence level that execution of the branch instruction will result in a taken branch;
    logic that computes, from the measured processor load, a branch confidence threshold, wherein the logic assigns a first value to the branch confidence threshold when a processor is heavily loaded, and wherein the logic assigns a second value to the branch confidence threshold when the processor is lightly loaded, and wherein the first value is less than the second value;
    a comparator that compares the confidence level with the branch confidence threshold; and
    logic that enables speculative execution arising from the branch instruction when the result of the comparison indicates the branch confidence threshold being lower than the confidence level, wherein the logic that disables speculative execution arising from the branch instruction when the result of the comparison is otherwise.

23. The computer of claim 22, wherein the logic that assigns the confidence level to the branch instruction further comprises a branch history counter that has a value reflecting the number of times execution of the branch instruction has previously resulted in a branch taken, and wherein the confidence level is derived from the branch history counter.

* * * * *